(12) United States Patent
Treichel et al.

(10) Patent No.: US 8,925,976 B2
(45) Date of Patent: Jan. 6, 2015

(54) FLANGED FITTING FOR USE WITH TUBING CONTAINMENT SYSTEM

(75) Inventors: Steven A. Treichel, West Chester, PA (US); Mark Miller, Malvern, PA (US)

(73) Assignee: Omega Flex, Inc., Middletown, CT (US)

( * ) Notice: Subject to any disclaimer, the term of this patent is extended or adjusted under 35 U.S.C. 154(b) by 323 days.

(21) Appl. No.: 12/715,426

(22) Filed: Mar. 2, 2010

(65) Prior Publication Data

US 2011/0215570 A1 Sep. 8, 2011

(51) Int. Cl.
*F16L 23/12* (2006.01)
*F16L 23/028* (2006.01)
*F16L 25/00* (2006.01)

(52) U.S. Cl.
CPC ......... *F16L 23/0283* (2013.01); *F16L 25/0036* (2013.01)
USPC .......................................................... 285/368

(58) Field of Classification Search
USPC ................. 285/903, 334.5, 412, 368
See application file for complete search history.

(56) References Cited

U.S. PATENT DOCUMENTS

| | | |
|---|---|---|
| 816,596 A | 4/1906 | Perzoff |
| 1,371,981 A | 3/1921 | Rose |
| 1,664,125 A | 3/1928 | Lowrey |
| 1,793,887 A | 2/1931 | White |
| 2,082,164 A | 6/1937 | Karrer |
| 2,113,211 A | 4/1938 | Lake |
| 2,158,620 A | 5/1939 | Eastman |
| 2,172,532 A | 9/1939 | Fentress |
| 2,323,099 A | 6/1943 | Patten |
| 2,713,503 A * | 7/1955 | Ekholm ..................... 285/146.2 |
| 2,848,254 A | 8/1958 | Millar |
| 3,506,039 A | 4/1970 | Marriott |
| 3,980,112 A | 9/1976 | Basham |
| 4,000,918 A | 1/1977 | Reker |
| 4,042,262 A | 8/1977 | Mooney et al. |
| 4,437,691 A | 3/1984 | Laney |
| 4,630,850 A | 12/1986 | Saka |
| 4,798,404 A | 1/1989 | Iyanicki |

(Continued)

FOREIGN PATENT DOCUMENTS

| | | |
|---|---|---|
| CN | 1761833 A | 4/2006 |
| DE | 10300417 A1 | 7/2004 |
| TW | 200745477 A | 12/2007 |
| TW | 200933058 A | 8/2009 |

OTHER PUBLICATIONS

PCT International Search Report and Written Opinion of the International Searching Authority for International Application No. PCT/US2011/026400, Apr. 19, 2011, 9 pages.

(Continued)

*Primary Examiner* — Daniel P Stodola
*Assistant Examiner* — James Linford
(74) *Attorney, Agent, or Firm* — Cantor Colburn LLP

(57) ABSTRACT

A fitting for use with metal tubing in a jacket, the fitting including: an adapter, the adapter having a tubular member defining a longitudinal passage having a longitudinal axis for fluid flow; a body for receiving the tubing, the body positioned opposite the adapter and aligned with the longitudinal axis; a sealing member positioned between the adapter and the body; a retainer positioned external to the sealing member, the retainer receiving the adapter and receiving the body; a first flange located near the adapter and a second flange located near the body; and a fastener for drawing the first flange and second flange towards each other.

3 Claims, 5 Drawing Sheets

(56) References Cited

U.S. PATENT DOCUMENTS

| | | |
|---|---|---|
| 4,801,158 A | 1/1989 | Gomi |
| 4,836,584 A | 6/1989 | Baker |
| 4,842,309 A | 6/1989 | LaVene et al. |
| 5,423,578 A | 6/1995 | Kanomata et al. |
| 5,441,312 A | 8/1995 | Fujiyoshi et al. |
| 5,454,603 A | 10/1995 | Staley |
| 5,456,502 A | 10/1995 | Sharp |
| 5,713,607 A | 2/1998 | Webb |
| 5,799,989 A | 9/1998 | Albino |
| 5,845,946 A | 12/1998 | Thomas |
| 5,969,618 A | 10/1999 | Redmond |
| 6,019,399 A | 2/2000 | Sweeney |
| 6,173,995 B1 | 1/2001 | Mau |
| 6,315,003 B1 | 11/2001 | Albino |
| 6,428,052 B1 | 8/2002 | Albino et al. |
| 6,431,608 B1 | 8/2002 | Kato |
| 6,502,866 B1 | 1/2003 | Hujisawa et al. |
| 6,877,781 B2 | 4/2005 | Edler |
| 6,993,819 B2 | 2/2006 | Homann |
| 7,004,510 B2 | 2/2006 | Treichel |
| 7,055,868 B2 | 6/2006 | Watanabe |
| 7,108,288 B2 | 9/2006 | Bennett et al. |
| 7,258,371 B1 | 8/2007 | Hagen et al. |
| 7,300,076 B2 | 11/2007 | Inoue |
| 7,621,567 B2 | 11/2009 | Duquette et al. |
| 2002/0079702 A1 | 6/2002 | Baumann et al. |
| 2004/0177486 A1 | 9/2004 | Homann |
| 2005/0285401 A1 | 12/2005 | Treichel et al. |
| 2006/0006651 A1* | 1/2006 | Watanabe ............ 285/903 |
| 2007/0273149 A1 | 11/2007 | Duquette et al. |
| 2009/0021001 A1 | 1/2009 | Oh |
| 2009/0102191 A1 | 4/2009 | Nakata et al. |
| 2009/0108579 A1 | 4/2009 | Vorley et al. |

OTHER PUBLICATIONS

International Search Report and Written Opinion: International Application No. PCT/US2008/075766; International Filing Date: Sep. 10, 2008; Date of Mailing: Nov. 10, 2008; 8 pages.

PCT International Preliminary Report on Patentability; International Application No. PCT/US20081075766; International Filing Date: Sep. 10, 2008; Date of Mailing: Mar. 25, 2010; 6 pages.

PCT International Preliminary Report on Patentability and Written Opinion of the International Searching Authority for International Application No. PCT/US2011/026400, Sep. 13, 2012, 8 pages.

Extended European Search Report, Supplementary European Search Report and European Search Opinion for International Application No. PCT/US2011026400, Jun. 11, 2014, 9 pages.

* cited by examiner

FLANGED FITTING FOR USE WITH TUBING CONTAINMENT SYSTEM

BACKGROUND OF THE INVENTION

The invention relates generally to piping systems and in particular to a fitting for use with a tubing containment system. Currently, flexible piping, such as corrugated stainless steel tubing, is used in a number of applications requiring primary and secondary containment. Various plumbing as well as local and federal mechanical codes and specifications require that certain types of installations of flexible piping be protected by a secondary containment system. Tubing containment systems exist in the art to contain fluids if the tubing fluids. One existing tubing containment system is disclosed in U.S. Pat. No. 7,004,510, the entire contents of which are incorporated herein by reference. A threaded fitting for use with a tubing containment system is disclosed in U.S. patent application Ser. No. 12/207,626, the entire contents of which are incorporated herein by reference.

SUMMARY

Embodiments of the invention include a fitting for use with metal tubing in a jacket, the fitting comprising: an adapter, the adapter having a tubular member defining a longitudinal passage having a longitudinal axis for fluid flow; a body for receiving the tubing, the body positioned opposite the adapter and aligned with the longitudinal axis; a sealing member positioned between the adapter and the body; a retainer positioned external to the sealing member, the retainer receiving the adapter and receiving the body; a first flange located near the adapter and a second flange located near the body; and a fastener for drawing the first flange and second flange towards each other.

DETAILED DESCRIPTION OF THE PREFERRED EMBODIMENTS

Figure 1:
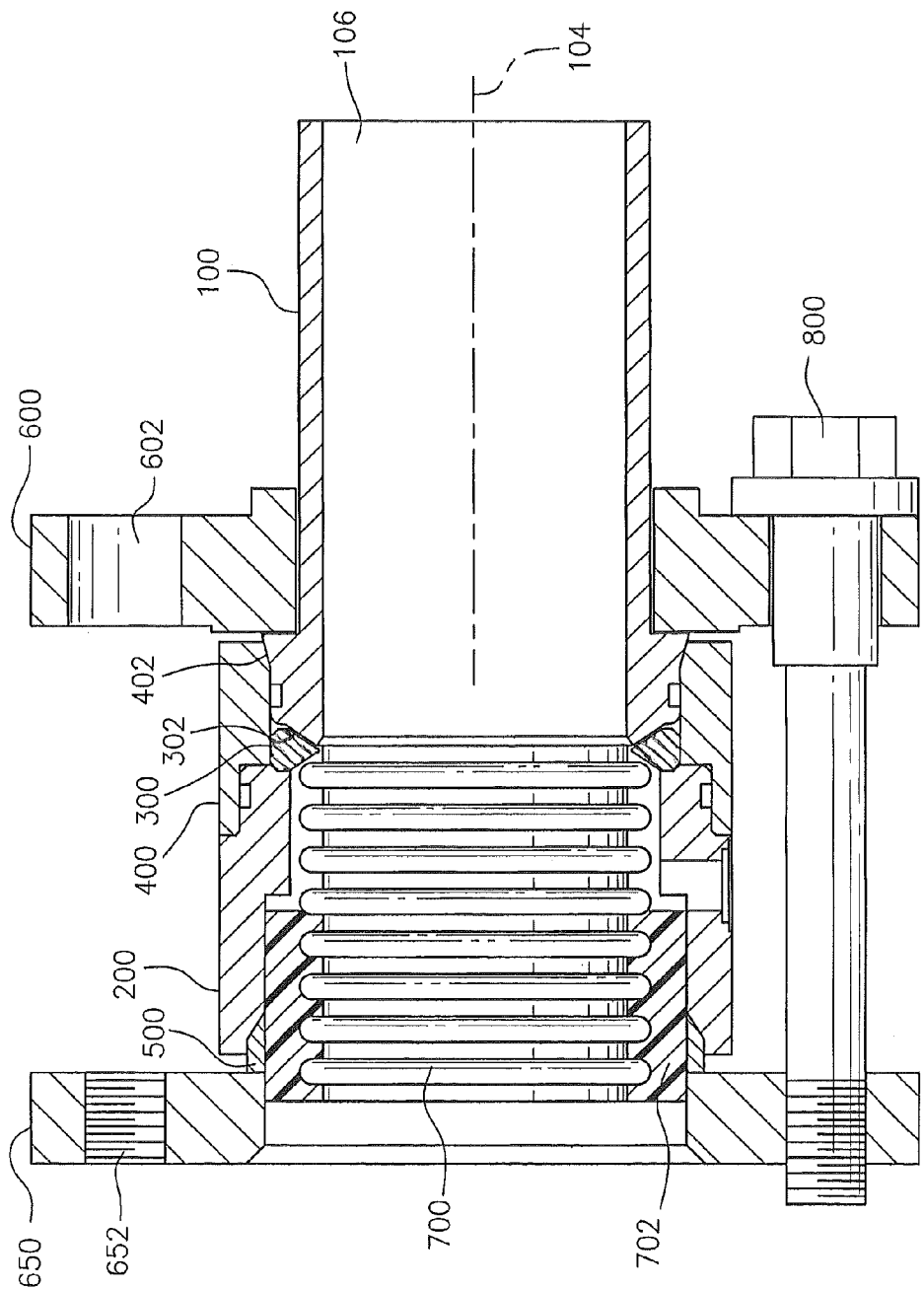
FIG. 1 is a cross-sectional view of an exemplary flanged fitting for use in a tubing containment system attached to tubing.

FIG. 1 is a cross-sectional view of an exemplary flanged fitting coupled to a tubing containment system. The fitting includes an adapter 100 and a body 200. Adapter 100 includes a longitudinal through passage 106 to allow fluid (gas, liquid, etc.) to flow. As described in U.S. Pat. Nos. 5,799,989, 6,079, 749 and 6,428,052, adapter 100 interacts with a sealing member 300 to compress corrugated tubing between the adapter 100 and sealing member 300 to form a fluid tight seal. Sealing member 300 may be a formed by split ring washers, a collet or other member. Retainer 400 is used to keep the sealing member 300 in place and guide the body into position during use. A ferrule 500 engages the jacket 702 of the corrugated tubing 700 to mechanically secure the jacket 702 to body 200. Ferrule 500 also creates fluid tight seal against body 200 as described in further detail herein.

Figure 2:
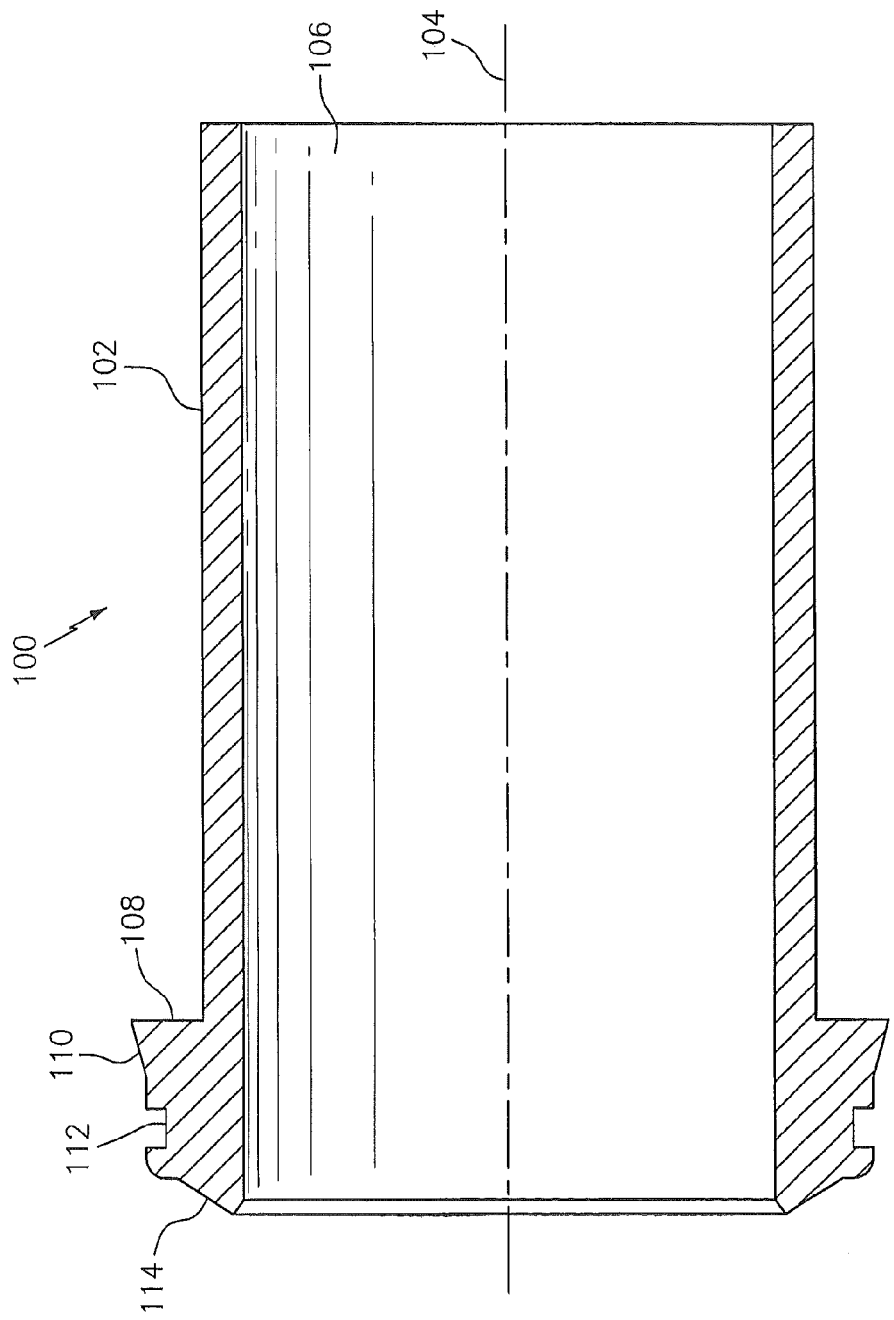
FIG. 2 is a cross-sectional view of the adapter of FIG. 1.

FIG. 2 is a cross-sectional view of the adapter 100 of FIG. 1. Adapter 100 includes a tubular member 102 defining through passage 106 along longitudinal axis 104. A shoulder 108 extends away from tubular member 102, and is generally perpendicular to longitudinal axis 104. Flange 600 contacts shoulder 108 when the fitting is assembled as described herein. A guiding surface 110 tapers from the shoulder 108, and has an oblique angle relative to the longitudinal axis 104 of the fitting. In an exemplary embodiment, the angle of the guiding surface 110 matches the angle of an inlet surface 402 on retainer 400. Adapter 100 includes an o-ring groove 112 for receiving an o-ring that seals against the interior of retainer 400. Adapter 100 includes an adapter sealing surface 114 that contacts the exposed corrugated tubing 700 and compresses the metal tubing 700 between the adapter sealing surface 114 and a sealing surface 302 on sealing member 300. In an exemplary embodiment, the angle of the adapter sealing surface 114 matches the angle of the sealing surface on sealing member 300.

Figure 3:
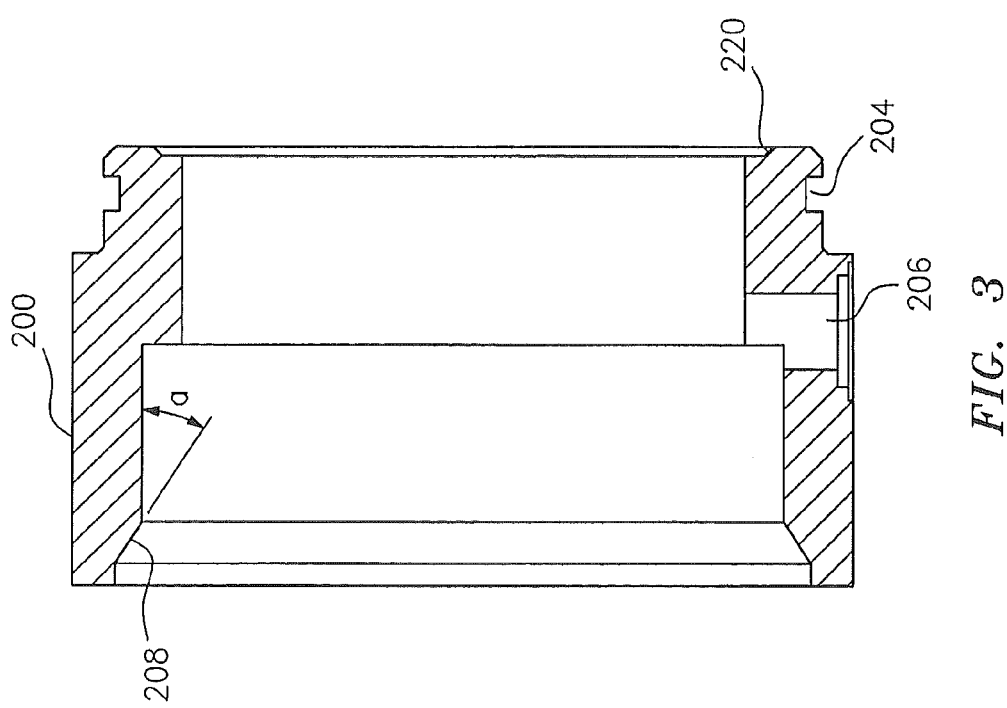
FIG. 3 is a cross-sectional view of the body of FIG. 1.

FIG. 3 is a cross-sectional view of the body 200 of FIG. 1. Body 200 includes an o-ring groove 204 formed on an exterior surface of the body at a first body end proximate the adapter 100. An o-ring may be positioned in the o-ring groove 204 to provide an enhanced seal between the body 200 and the retainer 400. Body 200 also includes features that provide for venting of fluid in the event of a fluid. Body 200 includes a vent opening 206 that extends through an exterior wall of body 200. Vent opening 206 provides for egress of fluid leaking from tubing 700 (FIG. 1). Sensors (not shown) may be placed in fluid communication with vent opening 206 for monitoring of leaking fluid.

A ferrule 500 is positioned on a rear end of the body 200 and engages the jacket 702 of tubing 700 (FIG. 1). The ferrule 500 is received in a frusto-conical annular recess 208 on the rear of the body 200 where tubing 700 enters the fitting. The recess 208 has a recess surface having an angle "a" relative to a longitudinal axis of the fitting, 104. In an exemplary embodiment, angle "a" equals 30 degrees.

Figure 4:
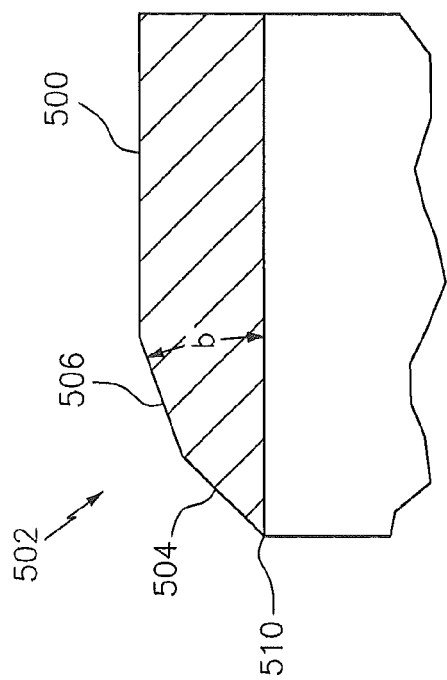
FIG. 4 is an enlarged, cross-sectional view of the ferrule of FIG. 1.

FIG. 4 is an enlarged, cross-sectional view of the ferrule 500 of FIG. 1. Ferrule 500 has a dual tapered surface 502 having a first section 504 and a second section 506. The first section 504 has a steep angle (e.g., 45 degrees) to define a sharp edge 510. This edge 510 is driven into the tubing jacket 702 when the fitting is assembled as described in further detail herein. The second section 506 has a more shallow angle "b" (e.g., 20 degrees). By making angle "b" less than angle "a" (on the recess 208) the edge 510 of ferrule 500 is driven towards the centerline of the body, into the jacket 702. Edge 510 engages jacket 702 and provides a mechanical attachment between the body 200 and the jacket 702. This provides a fluid-tight, mechanical attachment to the jacket 702 to control axial extension of the hose assembly under pressure. Also, the compression of ferrule 500 into the frusto-conical annular recess 208 and also provides a fluid-tight, metal-to-metal seal. Jacket 702 may be similar to that described in U.S. patent application Ser. No. 12/207,626.

In assembling the fitting to the tubing 700, the tubing 700 is fed through flange 650, ferrule 500, and body 200. The distal end of tubing 700 has the jacket 702 removed to expose at least one valley of the corrugated tubing 700. Corrugated tubing 700 has an exterior surface of undulating peaks and valleys. Sealing member(s) 300 is placed in an exposed valley of corrugated tubing 700. The tubing 700 is pulled back through the body 200 until the sealing member 300 contacts a shoulder 220.

Retainer 400 is slid over the sealing member 300. Adapter 100 is inserted into the retainer 400, guided by guiding surface 110 coacting with inlet surface 402. Flange 600 is positioned around tubular member 102. Fasteners (e.g., bolts) 800 pass though openings 602 in flange 600 and engage threads 652 in flange 650. In exemplary embodiments, four bolts are used.

As the bolts 800 are tightened, adapter sealing surface 114 contacts the exposed corrugated tubing 700 and compresses the metal tubing 700 between the adapter sealing surface 114 and a sealing surface 302 on sealing member 300. As flange 600 and flange 650 are drawn towards each other, the compression of the metal tubing 700 between the adapter sealing surface 114 and the sealing surface 302 folds the metal tubing 700 to form two layers of metal between adapter sealing surface 114 and sealing surface 302. This defines a metal-to-metal seal between the adapter 100 and tubing 700.

Further, as the bolts 800 are tightened, the ferrule 500 is driven into frusto-conical annular recess 208 in body 200. As the angle "a" of the recess 208 is greater than the angle "b" of second section 506 of tapered surface 502, the ferrule 500 is driven into the jacket 702. The edge 510 of ferrule 500 engages the jacket 702 to provide a secure fluid tight, mechanical connection. The compression of the ferrule 500 into recess 208 forms a fluid-tight seal between ferrule 500 and body 200.

Figure 5:
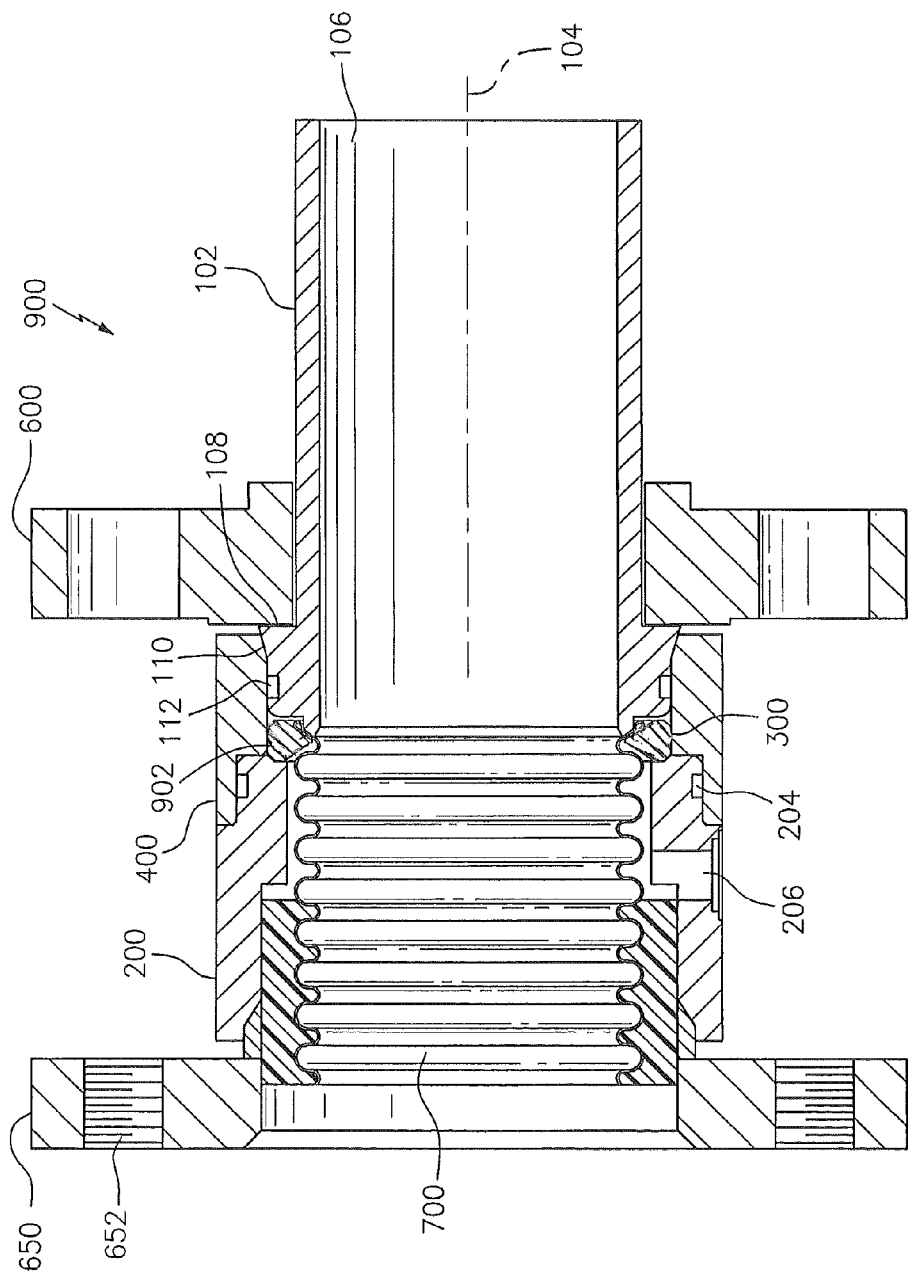
FIG. 5 is a cross-sectional view of a fitting in an alternate embodiment.
Figure 6:
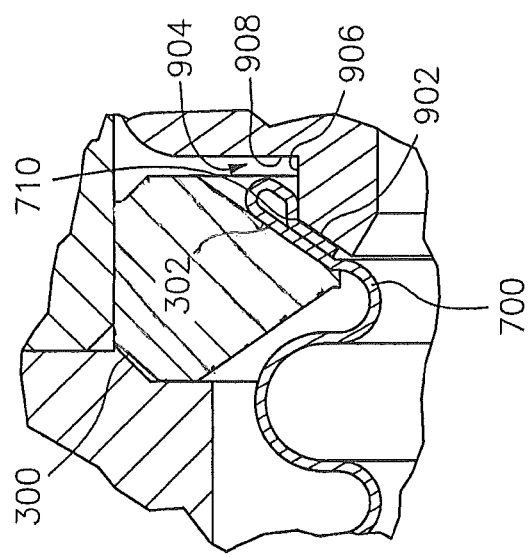
FIG. 6 is an enlarged, cross-sectional view of a portion of FIG. 5.

FIG. 5 is a cross-sectional view of a fitting 900 in an alternate embodiment. Many of the elements of fitting 900 are similar to those of fitting 100, and bear the same reference numeral. Fitting 900 varies in that the adapter sealing surface 902 is different than adapter sealing surface 114. FIG. 6 is an enlarged view showing the adapter sealing surface 902. Adapter sealing surface 902 has the same angle relative to the longitudinal axis 104 as sealing surface 302.

As shown in FIG. 6, the adapter sealing surface includes a cutaway 904 rendering the surface area of the adapter sealing surface 902 less than that of sealing surface 302. Cutaway 904 includes a first wall 906 substantially parallel to longitudinal axis 104. As second wall 908 is substantially perpendicular to longitudinal axis 104. In use, bolts 800 are tightened driving the adapter 100 into body 200. This compresses metal tubing 700 between the adapter sealing surface 902 and sealing surface 302 as shown in FIG. 6. As a peak of the metal tubing is compressed, the edge between sealing surface 902 and first wall 906 applies force to the tubing 700 to form an annular crimp 710 in the tubing 700. This crimp serves as a line seal and accommodates imperfections in the tubing 700 due to weld seams, mechanical tolerances, etc.

The tubing containment system may be used in a number of applications including direct underground burial, above ground outdoor use, indoor use at elevated pressure for safety and other secondary containment and sensing systems for petrochemical lines.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting coupled to metal tubing in a jacket, the fitting comprising:
    an adapter, the adapter having a tubular member defining a longitudinal passage having a longitudinal axis for fluid flow;
    a body for receiving the metal tubing, the body positioned opposite the adapter and aligned with the longitudinal axis, a vent opening formed through an exterior wall of the body;
    a metal sealing member positioned between the adapter and the body,
    a retainer positioned external to the sealing member, the adapter and the body, the retainer receiving the adapter in an interior of the retainer and receiving the body in an interior of the retainer;
    a first flange contacting the adapter and a second flange juxtaposed the body and in abutting engagement with a ferrule; the ferrule at a second body end, the ferrule for engaging the jacket of the metal tubing to mechanically attach the fitting to the jacket, the ferrule providing fluid-tight seal between the ferrule and the body; and
    a fastener coupling the first flange and second flange;
    wherein the adapter includes a shoulder extending from the tubular member, the first flange engaging the shoulder;
    wherein the adapter includes a guiding surface having an angle with respect to the longitudinal axis, the retainer includes an inlet surface having the angle with respect to the longitudinal axis;
    wherein the adapter includes an o-ring groove formed on an exterior surface thereof for receiving an o-ring for sealing against the retainer;
    wherein the adapter includes an adapter sealing surface, the metal sealing member includes a sealing surface, the adapter sealing surface and sealing surface coacting to compress metal tubing between the adapter sealing surface and the sealing surface by deforming the tubing;
    wherein the body includes an o-ring groove formed on an exterior surface thereof for receiving an o-ring for sealing against the retainer;
    wherein the body includes a frusto-conical annular recess at a distal portion of the second body end, the ferrule positioned in the frusto-conical annular recess, the frusto-conical annular recess has a recess surface having a first angle relative to the longitudinal axis, the ferrule having a tapered surface, a portion of the tapered surface having a second angle relative to the longitudinal axis, the second angle less than the first angle.

2. The fitting coupled to the metal tubing of claim 1 wherein the retainer receives a portion of the adapter.

3. The fitting coupled to the metal tubing of claim 1 wherein the retainer receives a portion of the body.

* * * * *